US008266356B2

(12) United States Patent  
Lyle et al.

(10) Patent No.: US 8,266,356 B2  
(45) Date of Patent: Sep. 11, 2012

(54) INTERCONNECTING COMPUTING MODULES TO FORM AN INTEGRATED SYSTEM

(75) Inventors: Stephen B. Lyle, Granite Bay, CA (US); Loren M. Koehler, Fair Oaks, CA (US); Dick T. Fong, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 372 days.

(21) Appl. No.: 12/635,613

(22) Filed: Dec. 10, 2009

(65) Prior Publication Data

US 2011/0145467 A1 Jun. 16, 2011

(51) Int. Cl.
*G06F 13/00* (2006.01)
(52) U.S. Cl. .................. 710/104; 713/185; 702/187
(58) Field of Classification Search .................. 710/104, 710/300, 303; 713/185; 702/187
See application file for complete search history.

(56) References Cited

U.S. PATENT DOCUMENTS

| 6,976,112 | B2  | 12/2005 | Franke et al. |
| 7,013,385 | B2  | 3/2006  | Abbondanzio et al. |
| 7,131,030 | B2* | 10/2006 | Gilstrap et al. ................. 714/25 |
| 7,230,929 | B2  | 6/2007  | Betker et al. |
| 8,108,914 | B2* | 1/2012  | Hernoud et al. ................. 726/5 |
| 2006/0129709 | A1 | 6/2006 | Bandholz et al. |
| 2008/0270666 | A1 | 10/2008 | Malone et al. |
| 2011/0078354 | A1* | 3/2011 | Krueger et al. ............... 710/303 |

* cited by examiner

*Primary Examiner* — Clifford Knoll

(57) ABSTRACT

Systems, methods and portable devices are provided for interconnecting one or more computing modules within an enclosure together to form an integrated system. A portable device may include a communication interface configured to be removably coupled to each computing module for interconnecting them together to form the integrated system. A portable device may also include memory configured to store an integrated system personality that serves as a point of authority for each computing module of the integrated system. The integrated system personality may include an identifier of the integrated system.

19 Claims, 4 Drawing Sheets

INTERCONNECTING COMPUTING MODULES TO FORM AN INTEGRATED SYSTEM

BACKGROUND

A plurality of computing modules such as blade computers may be configured to cooperate to form an integrated or cluster computing system. For example, multiple blade computers within a blade enclosure may be interconnected using a fabric interconnection device to form an integrated system.

Over time, an integrated system develops a set of traits and characteristics, such as engineering history, settings of the integrated system that are to be enabled or disabled, and software executing on one or more computing modules used to form the integrated system. Software licensing information may also be generated. For example, a piece of software may be licensed to a particular computing module of the integrated system based on a unique identifier (e.g., a serial number) of the particular computing module. These traits and characteristics may be retained in various locations, such as memory of one or more of the computing modules forming the integrated system.

When a computing module of an integrated system fails, it is necessary to swap out the failed computing module with a new computing module. However, in order to become a functional piece of the integrated system, the new computing module needs to obtain information about the integrated system, including the traits, characteristics and software information mentioned above. In some cases, the new computing module obtains information about the integrated system from one or more of the other computing modules of the integrated system. However, storing information about the integrated system on the computing modules themselves requires constant synchronization as computing modules are swapped out over time. Moreover, when this information is stored on multiple computing modules of an integrated system, it may not be clear which computing module has the correct or most up-to-date information.

In some instances, a particular computing module of the plurality of computing modules forming an integrated system may be designated as a master computing module. This module may be charged with retaining information about the integrated system. However, the retained information is at the mercy of the master computing module. Should the master computing module fail, the information about the integrated system could be lost. Additionally, the master computing module may not be usable with other integrated systems because it already has the information about a specific integrated system.

DETAILED DESCRIPTION

Systems, methods and portable devices are provided herein for interconnecting a predetermined number of computing modules within an enclosure together to form an integrated system. Portable devices as described herein may include memory that may be used as a data repository for a particular integrated system. In this sense, the device may serve as a point of authority for the predetermined number of computing modules that are interconnected together to form the integrated system. As used herein, the term "interconnect" means to electronically and/or physically connect two or more computing modules.

An integrated system formed with a predetermined number of computing modules may develop a set of traits and characteristics over time. For purposes of this disclosure, these traits and characteristics form part of what is referred to herein as an "integrated system personality." At its most basic, an integrated system personality may include a distinct or even unique identity of the integrated system. This identity may be used to distinguish the integrated system for various purposes, such as for the licensing of software executing on one or more computing modules of the integrated system. An integrated system personality may include other distinctive information about the integrated system, such as features of the integrated system that are disabled or enabled, settings and parameters relating to the nature of the interconnection between the plurality of computing modules that form the integrated system, a partition description that is used to allocate the plurality of computing modules among one or more logical partitions within the integrated system, and so forth.

Figure 1:
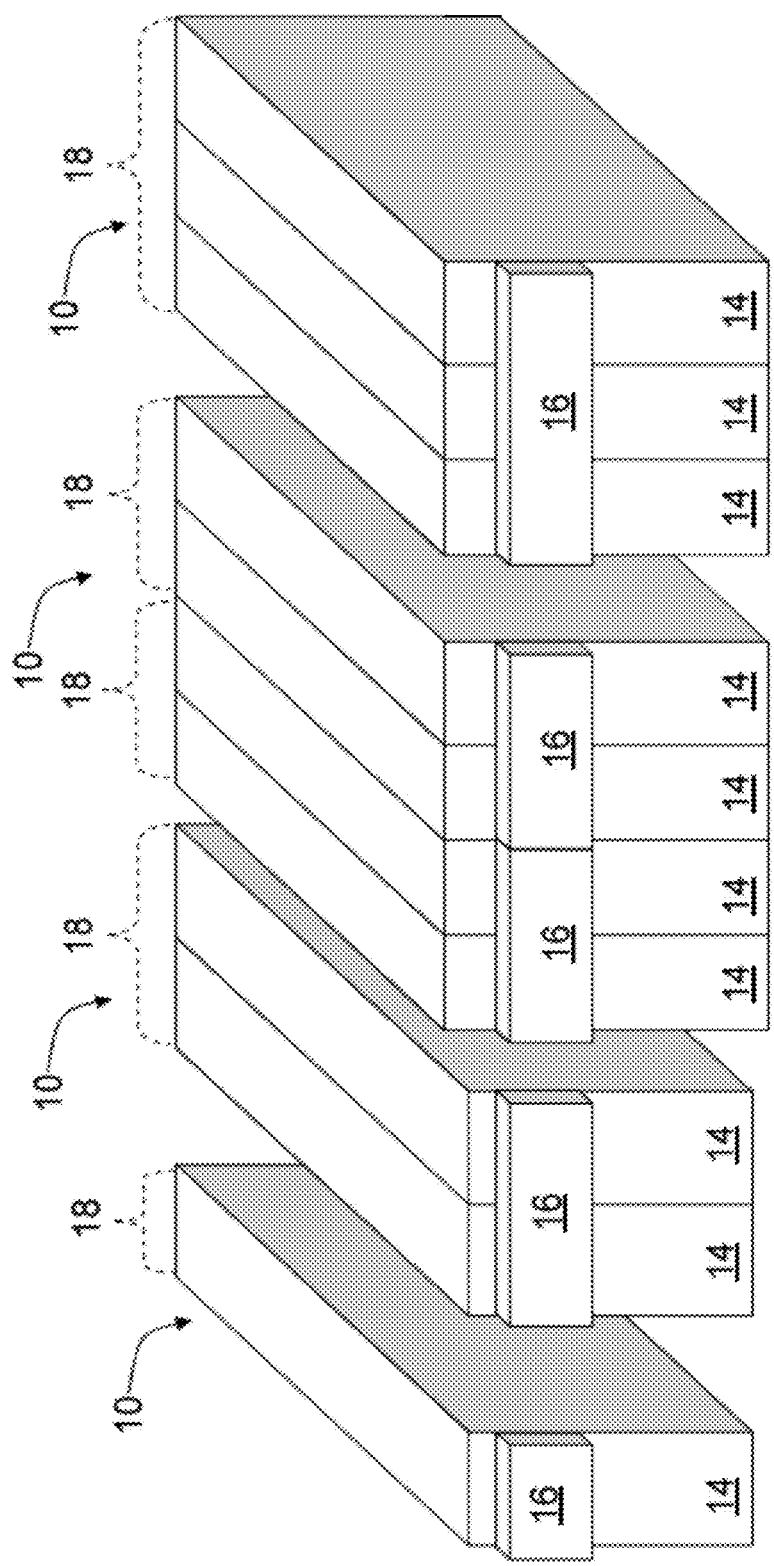
FIG. 1 depicts examples of portable devices being used to interconnect computing modules together to form integrated systems, according to one or more embodiments of the invention.

FIG. 1 depicts examples of enclosures 10 having various numbers of computing modules 14. Computing modules 14 may be devices that may be interconnected together using a portable device 16 as described herein to form an integrated system 18. As will be discussed further below, a personality of the integrated system 18 may be retained outside of the computing components.

In exemplary embodiments, each computing module 14 is a field-replaceable unit (FRU) such as a blade computer. Each computing module 14 may include various components that are not shown here but are typically found in computing modules, including one or more processors (e.g., a regular CPU and a management processor), memory that is accessible to the one or more processors, and input and output interfaces.

In each example in FIG. 1, a portable device 16 is specifically designed to interconnect a predetermined number of computing modules 14 together to form an integrated system 18. In the first example on the left, the predetermined number of computing modules 14 is one, and so portable device 16 does not interconnect multiple computing modules 14, but rather retains an integrated system personality for a single computing module 14 to which portable device 16 is connected.

In the second example from the left of FIG. 1, a single portable device 16 is used to interconnect two computing modules 14 together to form an integrated system 18. In the third example, two portable devices 16 are used to interconnect four computing modules 14 together to form two integrated systems 18. In the fourth example, portable device 16 is used to interconnect three computing modules 14 together to form an integrated system 18.

The computing modules 14 that are interconnected together to form each integrated system 18 in FIG. 1 may be generic. A computing module 14 from one integrated system 18 may be swapped out for a computing module 14 from another integrated system 18, and the resulting integrated system 18 may function the same in either case. For example, the single computing module 14 in the first example on the left may be generic, and the portable device 16 may be connected to another, similar generic computing module 14, which may adopt the same integrated system personality and operate in much the same way as the original computing module 14. Similarly, the portable device 16 that is shown connecting two computing modules 14 may be used to connect two different computing modules 14 into an integrated system 18. Because the computing modules 14 are generic, the second integrated system 18 may operate in much the same way as the first integrated system 18.

Figure 2:
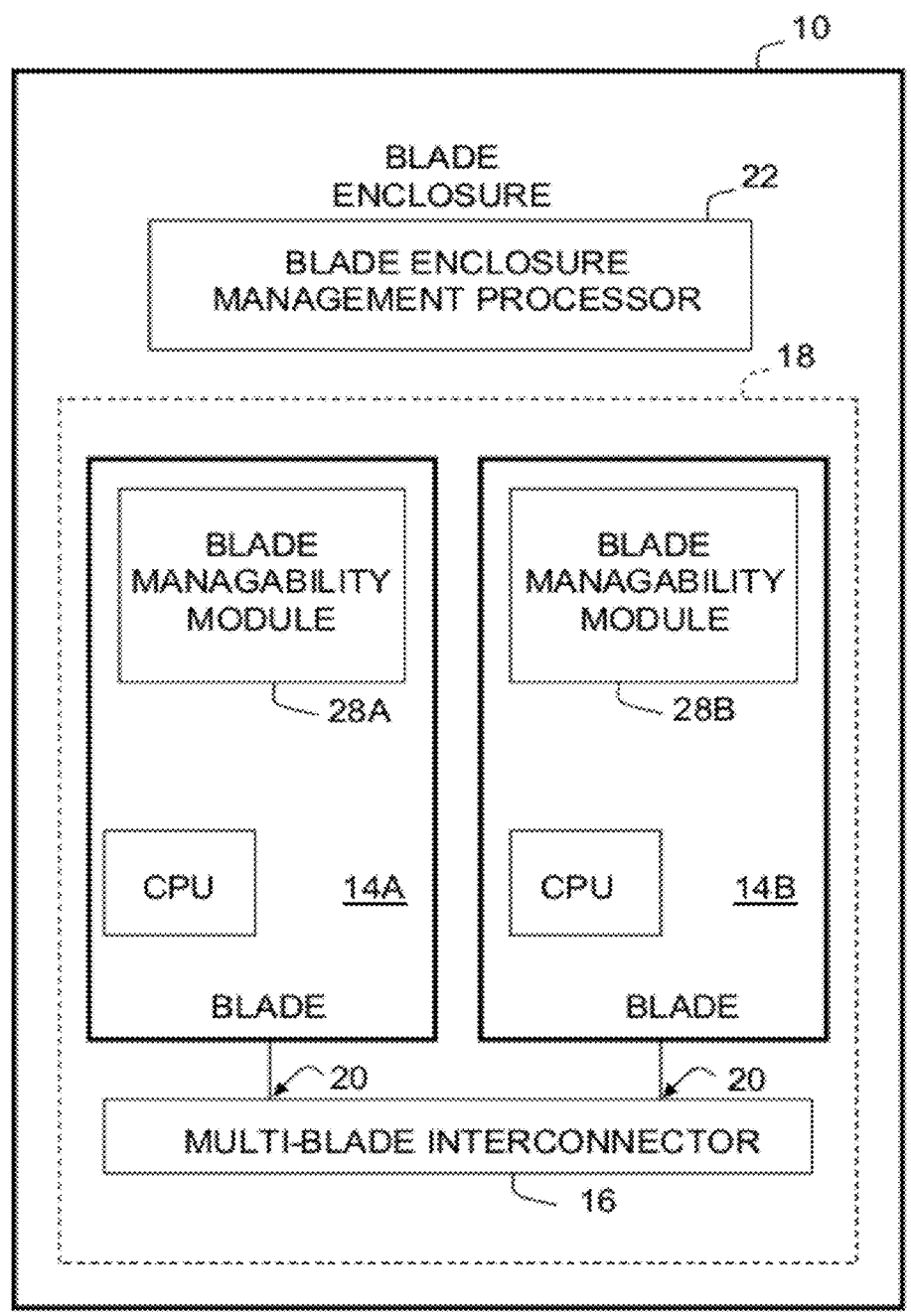
FIG. 2 depicts, schematically, an example of two computing modules interconnected with a portable device to form an integrated system, according to an embodiment of the invention.

FIG. 2 depicts, schematically, an example similar to the second example of FIG. 1, where a portable device 16 is used to interconnect two computing modules, 14A and 14B, together to form an integrated system 18. In this example, portable device 16 is a fabric interconnect device that includes two communication interfaces 20, each configured to be removably coupled to a computing module (such as 14A and 14B). Portable devices having more or less communication interfaces are contemplated herein.

Enclosure 10 may include an enclosure management processor 22, which in this example is a blade enclosure management processor executing blade management firmware. Enclosure management processor 22 may be configured to interact with each computing module of the enclosure 10, which in this case are blade computers 14A and 14B, and to manage the resources shared between the computing modules. The shared resources may include components such as fans, power supplies, and so forth. A user wishing to interact with one or more computing modules of enclosure 10 may do so through enclosure management processor 22.

Figure 3:
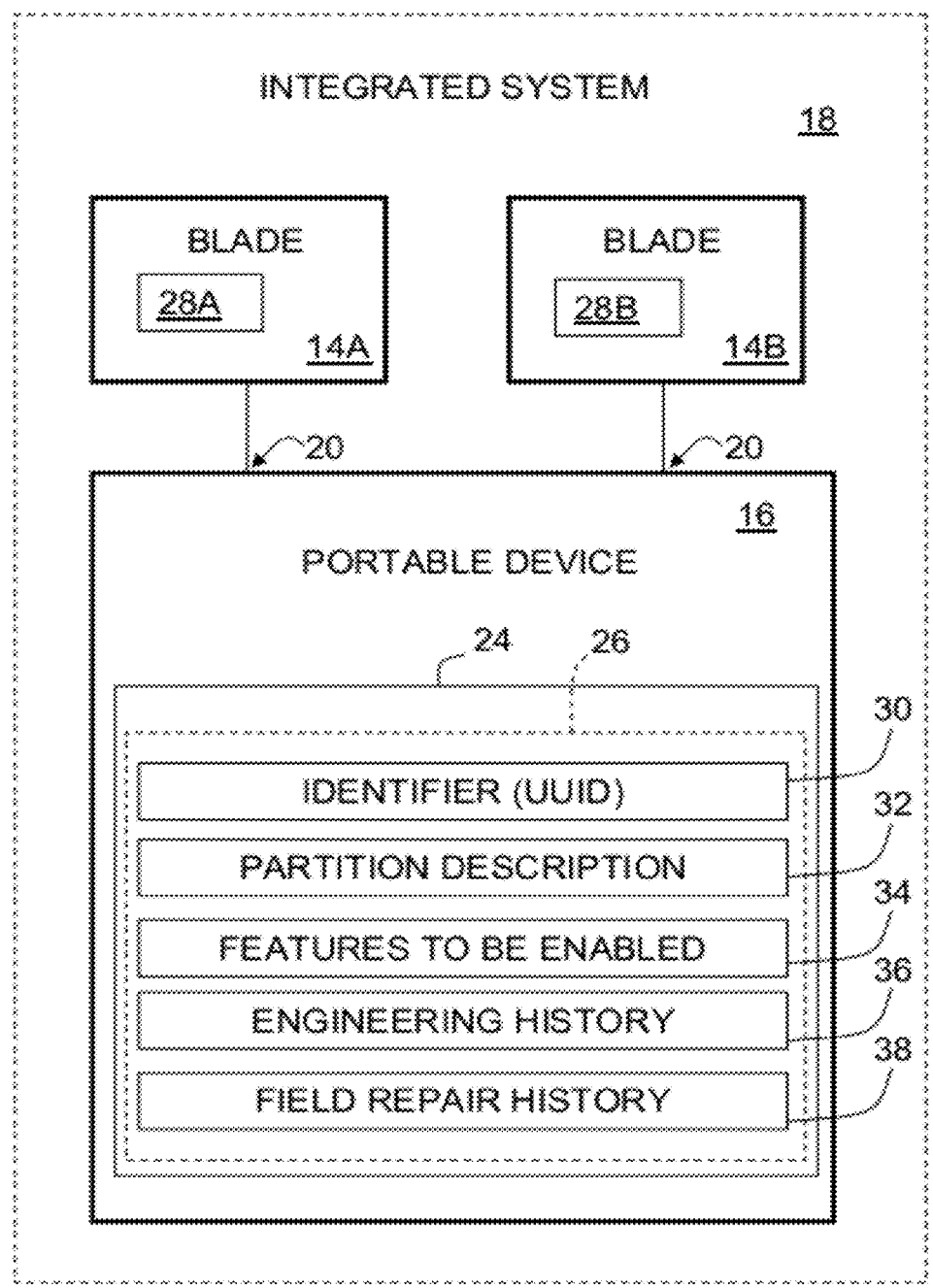
FIG. 3 depicts, schematically, a portable device for interconnecting a predetermined number of computing modules together to form an integrated system, similar to that shown in FIG. 2, according to an embodiment of the invention.

FIG. 3 depicts, schematically, integrated system 18, and shows in more detail the portable device 16 of FIG. 2 in more detail. Portable device 16 includes memory 24, which may be used to retain an integrated system personality 26 of the integrated system 18 that is formed when portable device 16 is used to interconnect a number of computing modules. Portable device memory 24 may take various forms, such as nonvolatile storage (e.g., I2C-connected EEPROM), RAM, and the like.

The two computing modules are labeled 14A and 14B, and include management processors 28A and 28B, respectively. A management processor of a computing module may be configured to control hardware resources of the computing module, among other things. For example, a user may issue power and/or reset commands to the management processor of a computing module.

The integrated system personality 26 stored in device memory 24 may include various pieces of information that together form a personality of an integrated system 18. This information may be obtained by the computing modules to which portable device 16 is connected, so that they may form the integrated system 18.

The integrated system personality 26 in FIG. 3 includes an identifier 30, which may in some instances be a Universally Unique Identifier (UUID) such as those described in RFC 4122. Providing an integrated system 18 with an identifier 30 allows for the licensing of products such as software to the integrated system 18 as a whole, as opposed to being licensed to individual computing modules of the integrated system 18. For example, assume that an owner of an integrated system formed with four computing components such as blades purchases a license to use a particular piece of software. Assume also that the licensor tracks and/or controls use of the software based on a UUID of a licensed computing system. If the owner's software license were based on a UUID of one of the four computing components of his or her integrated system, and that computing component failed, the owner would be required to update his or her license with a UUID of a different computing component.

In contrast, if the owner had associated the UUID of the integrated system with the software license, then failure of one, or even all the computing components, would not require the owner to update his or her license. Rather, he or she could simply replace all failed computing components and interconnect the replacement computing components with the same portable device that he or she was using on the failed computing components. Because the identifier 30 is stored in device memory 24 of the portable device 16, each replacement computing component may obtain a copy and operate together with the other computing components of the integrated system just as before the failure.

Referring still to FIG. 3, an identifier 30 may include additional information about the identity of the integrated system 18 formed by the portable device 16, such as a model name and model number. Providing a model number or name of an integrated system 18 may allow one portable device 16 to be differentiated from another by the model name of the integrated system 18 that is formed when the portable device 16 is used to interconnect computing modules 14A and 14B. Moreover, portable devices 16 that are similar (e.g., used to interconnect the same number of the same type of computing modules) may be given the same model name, and various model names may be associated with various price points, just as various models of automobiles are marketed to various price points.

The integrated system personality 26 stored in device memory 24 of FIG. 3 also includes a partition description 32 that that may be distributed among the computing modules included in the integrated system 18. With this partition description 32, enclosure management processor 22 (FIG. 2) and/or the computing modules themselves may allocate the computing modules among one or more logical partitions within an integrated system 18. In FIGS. 2 and 3, there is only a single partition in the integrated system 18, but in other examples, a portable device may include a partition description 32 that allocates the multiple computing modules among any number of partitions.

Another type of information that may be stored in memory 24 as part of an integrated system personality 26 relates to features of the integrated system to be enabled or disabled 34. For example, services that may be unnecessary, or may even pose a security risk, (e.g., ping, HTTP, FTP), may be enabled/disabled.

Engineering History 36 and field repair history 38 may also be included in integrated system personality 26. Engineering history 36 may include—in addition to system personality traits and characteristics that evolve over time—a factory default personality of the integrated system 18. The portable device 16 may revert or be reverted to the factory default personality in any number of circumstances, such as where one or more computing modules of integrated system 18 change positions or are swapped out, or where power policies are changed (e.g., cold power-on of the product).

Field repair history 38 may include changes to the computing modules of the integrated system 18 over time. For example, each computing module may include a unique identifier, such as a serial number. When a portable device 16 is connected to the predetermined number of computing modules to form an integrated system 18, the unique identifier for each computing module may be stored in the portable device memory 24. If a computing module is replaced (e.g., due to failure), a unique identifier for the replacement computing module may be stored in device memory 24, possibly in a fixed relation to the unique identifier of the computing module that was replaced. Accordingly, the field repair history of the predetermined number of computing modules may be tracked. Field repair history may include other information about the computing modules and/or the portable device 16, such as firmware update history and the like.

Integrated system personality 26 may also include optimized electrical parameter settings for the communication interfaces 20 interconnecting the computing modules of the integrated system 18. For example, optimized pathways between the management processors 28A and 28B of computing modules 14A and 14B (respectively) may be defined. Such predefined pathways also may provide a first management processor 28A with efficient access to the enclosure management processor 22. Pathways between management processors may also be defined so that one management processor 28A may efficiently distribute integrated system personality 26 to one or more management processors 28B of one or more other computing modules of the integrated system 18, as will be described below.

Portable device memory 24 may be accessible by all or only a subset of a number of computing modules that are interconnected using portable device 16 to form integrated system 18. For example, a management processor 28A of the first computing module 14A may be allowed exclusive access to device memory 24. Management processor 28B of the second computing module 14B may not be provided with access to device memory 24. Rather, the management processor 28A of the first computing module 14A may provide the integrated system personality to one or more management processors of one or more other computing modules of the integrated system 18.

In other embodiments, more than one management processor may have access to device memory 24. In fact, in some embodiments, a management processor of each computing module forming the integrated system 18 may be provided with access to device memory 24. In such cases, access to device memory 24 may be controlled using a semaphore.

In some embodiments, integrated system personality 26 may be stored in memory of one or more computing modules, in addition to memory 24 of portable device 16, for backup purposes. If portable device 16 and/or its memory 24 fail, a backup copy stored in memory of one or more of the computing modules may be used to restore integrated system personality to another portable device 16.

Figure 4:
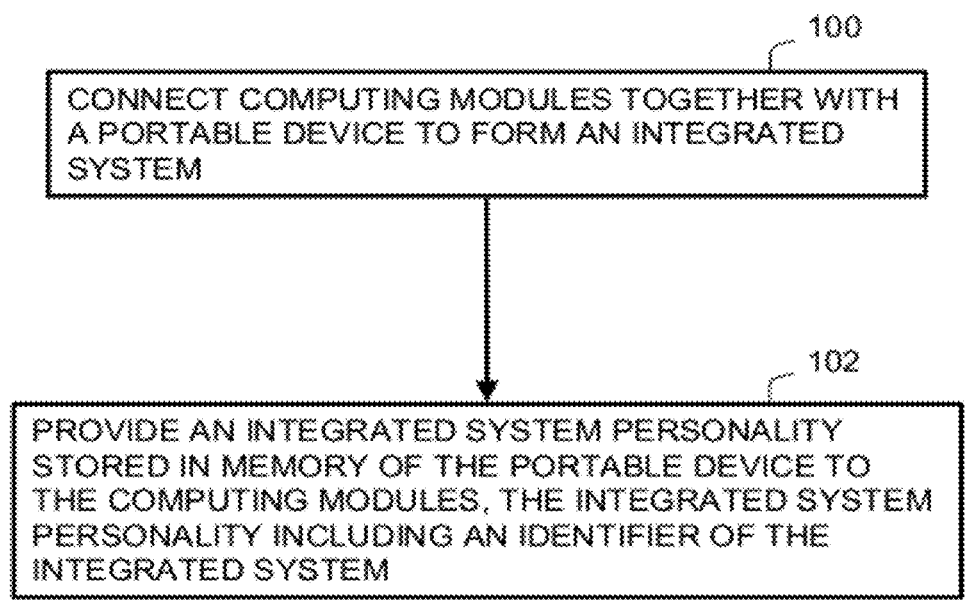
FIG. 4 depicts a method of using a portable device to interconnect computing modules together to form an integrated system, according to an embodiment of the invention.

FIG. 4 depicts an example method of forming an integrated system 18 from a predetermined number of computing modules within an enclosure 10. In step 100, each of the predetermined number of computing modules 14 is connected together with a portable device 16 to form the integrated system 18. As shown in FIG. 1, portable device 16 may be designed specifically to interconnect a predetermined number of computing modules 14 (e.g., 1, 2, 3), based upon the predetermined number of communication interfaces 20 it includes.

In step 102, an integrated system personality 26 stored in memory 24 of portable device 16 is provided to a management processor 28A of a first computing module 14A. In some examples, the integrated system personality is copied only to the first computing module 14A, which then provides the integrated system personality 26 to one or more other computing modules of the integrated system. In other embodiments, the integrated system personality 26 may be copied onto a subset of the predetermined number of computing modules. In yet other examples, the integrated system personality may be copied into memory of each of the computing modules.

As noted above, an integrated system personality 26 may include a partition description that is used to allocate the predetermined number of computing modules among one or more logical partitions within the integrated system 18. Partition description may also include information about a role each computing modules in a partition may play. For example, one computing module (e.g., 14A) may be a primary or master computing module, and the rest of the computing modules (e.g., 14B) of a partition may be secondary or auxiliary. Each computing module may read and process the partition description after receiving it at step 102.

The disclosure set forth above may encompass multiple distinct embodiments with independent utility. The specific embodiments disclosed and illustrated herein are not to be considered in a limiting sense, because numerous variations are possible. The subject matter of this disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

Where the claims recite "a" or "a first" element or the equivalent thereof, such claims include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

We claim:

1. A portable device for interconnecting computing modules within an enclosure together to form an integrated system, each of the computing modules including a central processing unit (CPU) and a management processor, the device comprising:
   memory configured to store an integrated system personality that serves as a point of authority for each computing module of the integrated system, the integrated system personality including an identifier of the integrated system; and
   a communication interface configured to be removably coupled to each computing module to interconnect them together to form the integrated system and to provide the integrated system personality stored in the memory to a management processor of at least one of the computing modules.

2. The device of claim 1, wherein the integrated system personality further includes a partition description that is used to allocate the computing modules among one or more logical partitions within the integrated system.

3. The device of claim 1, wherein the integrated system personality further includes information about features of the integrated system that are to be enabled or disabled.

4. The device of claim 1, wherein the integrated system personality further includes field repair history of the computing modules.

5. The device of claim 1, wherein the identifier of the integrated system is a Universally Unique Identifier (UUID).

6. The device of claim 1, wherein the integrated system personality further includes optimized electrical parameter settings for the communication interfaces interconnecting the computing modules.

7. The device of claim 1, wherein the integrated system personality further includes one or more of a model name and an engineering revision history of the integrated system.

8. A method of forming an integrated system from one or more computing modules within an enclosure, each of the computing modules including a central processing unit (CPU) and a management processor, the method comprising:
   connecting each of the computing modules together with a portable device to form the integrated system; and
   providing an integrated system personality stored in memory of the portable device to a management processor of a first computing module of the computing modules, the integrated system personality including an identifier of the integrated system.

9. The method of claim 8, further comprising sharing, by the management processor of the first computing module, the integrated system personality with management processors of others of the computing modules.

10. The method of claim 9, further comprising:
    providing the management processor of the first computing module with access to the memory of the device; and
    not providing management processors of all other computing modules of the predetermined number of computing modules access to the memory of the device.

11. The method of claim 8, further comprising:
    providing a management processor of each of the predetermined number of computing modules with access to the memory of the device; and
    controlling access to the memory of the device using a semaphore.

12. The method of claim 8, further comprising storing a copy of the integrated system personality in memory of each of the computing modules.

13. The method of claim 12, further comprising restoring the integrated system personality to a portable device from memory of one of the computing modules.

14. The method of claim 8, further comprising associating the identifier of the integrated system with a software license.

15. An integrated system, comprising:
    one or more computing modules each having a central processing unit (CPU) and a management processor;
    means for interconnecting each of the computing modules physically and electronically; and
    means for retaining an identity of the integrated system outside of the one or more computing modules;
    wherein a management processor of a first computing module of the computing modules is permitted access to the means for retaining the unique identity; and
    management processors of all other computing modules of the modules are denied access to the means for retaining the unique identity.

16. The integrated system of claim 15, further comprising software executing on one or more of the computing modules that is licensed to the integrated system based on its identity.

17. The integrated system of claim 15, wherein the means for retaining the identity further includes means for retaining a partition description that is used to allocate the computing modules among one or more logical partitions within the integrated system.

18. The integrated system of claim 15, wherein the means for retaining the unique identify further includes means for retaining information about features of the integrated system that are to be enabled or disabled.

19. The integrated system of claim 15, wherein the means for retaining the unique identify further includes means for retaining field repair history of the computing modules.

* * * * *